United States Patent [19]

Eiermann et al.

[11] Patent Number: 4,805,452
[45] Date of Patent: Feb. 21, 1989

[54] DEVICE FOR THE THERMAL MEASUREMENT OF THE MASS FLOW GASES AND LIQUIDS

[75] Inventors: Kurt Eiermann, Pfungstadt; Reiner Goebel, Hanau; Peter Gries, Goetzenhain; Martin Hohenstatt, Hammersbach, all of Fed. Rep. of Germany

[73] Assignee: Degusa Aktiengesellschaft, Frankfurt am Main, Fed. Rep. of Germany

[21] Appl. No.: 931,777

[22] Filed: Nov. 18, 1986

[30] Foreign Application Priority Data

Dec. 4, 1985 [DE] Fed. Rep. of Germany ....... 3542788

[51] Int. Cl.⁴ ............................................... G01F 1/68
[52] U.S. Cl. ................... 73/204.26; 73/202.5
[58] Field of Search ............... 73/204, 272 R, 202; 338/28

[56] References Cited

U.S. PATENT DOCUMENTS

| | | | |
|---|---|---|---|
| 4,393,697 | 7/1983 | Sato et al. | 73/204 |
| 4,498,337 | 2/1985 | Gruner | 73/204 |
| 4,548,078 | 10/1985 | Bohrer et al. | 73/204 |
| 4,561,302 | 12/1985 | Sumal et al. | 73/202 |
| 4,578,996 | 4/1986 | Abe et al. | 73/204 |

FOREIGN PATENT DOCUMENTS

| | | | |
|---|---|---|---|
| 0236023 | 11/1985 | Japan | 73/204 |
| 2170606 | 8/1986 | Japan | 73/204 |

*Primary Examiner*—Herbert Goldstein
*Attorney, Agent, or Firm*—Beveridge, DeGrandi & Weilacher

[57] ABSTRACT

A device for the measurement of the mass flows of gases and liquids in pipelines by means of an anemometer arrangement, comprising electrical resistors. The temperature dependent measuring and reference resistors together with connecting leads are each surrounded by a protective tube, which in the region of the resistors is provided with a transverse cylindrical bore, the length to diameter ratio of which must be at least 1.5.

17 Claims, 2 Drawing Sheets

DEVICE FOR THE THERMAL MEASUREMENT OF THE MASS FLOW GASES AND LIQUIDS

The invention relates to a device for the thermal measurement of the mass flow of gases and liquids in pipelines containing at least two temperature dependent thin film resistors, which, as measuring and reference resistors, form part of a bridge circuit, are in thermal contact with the flowing medium and at least one of which is electrically heated by means of a control circuit.

In process engineering, the mass flow of gases and liquids participating in the process is needed for optimum process control as well as for accurate balancing of quantities. In addition to a need for high measuring precision over the entire measuring range and a short response time, the requirements imposed on the corresponding measuring instruments are, in particular, ease of handling and resistance to chemically aggressive media at temperatures which are high in certain cases.

For this field of application, numerous flow measuring devices in the form of orifice plates or Venturi tubes with appropriate differential pressure gauges have already been proposed. Measuring instruments based on the float principle and on vortex shedding are also known. These measuring instruments permit only measurement of the volume flow and, for mass flow measurements, require a density correction. Moreover, they are usually very susceptible to flow problems and are not easy to handle especially concerning installation in pipelines.

Thermal mass flow meters based on the hot wire or hot film anemometer principle have also been described. The measuring principle permits direct measurement of the mass flow and enables high measuring precision over a large measuring range with simultaneous short response time. A disadvantage of these devices is the fact that a sensor, a measuring tube and flow influencing elements which may be necessary represent an inseparable unit. This hinders installation into already existing pipelines and permits removal for cleaning and repair purposes, only when the system is shut down.

Moreover, the measured results of these devices are dependent on the upstream conditions; i.e., on the flow conditions in the pipeline upstream of the measuring instrument. Installation of honeycombs or screens upstream of the sensor does reduce this dependence, but leads to pressure losses and dirt deposits in the case of dirty gases and liquids.

An air mass measuring device is described in DE-OS No 33 26 047 with an electronic control circuit for pipelines, consisting of a temperature dependent measuring resistor and a temperature dependent reference resistor as elements of a common bridge circuit, wherein a cylindrical support body has a rectangular opening parallel to the direction of flow, and in which the measuring resistor is fixed. Although this device is relatively easy to handle during installation in pipelines, and removal from pipelines, the measured results still have a relatively strong dependence on the upstream conditions and, if thin film resistors are used, are sensitive to deviations from exact alignment of the thin film resistors parallel to the direction of flow.

It was therefore the object of the present invention to develop a device for the thermal measurement of the mass flow of gases and liquids in pipelines, having at least two temperature dependent thin film resistors, which as measuring and reference resistors form part of a bridge circuit and are in thermal contact with the flowing medium; at least one of which is electrically heated by means of a control circuit. With a short response time and a wide measuring range, this device should result in a high measuring precision, independently of the upstream conditions and perfect alignment of the thin film resistors exactly parallel to the direction of flow.

In achieving the object, one feature of the invention resides in that the thin film resistors together with connecting leads are each surrounded by a protective tube, which, in the region of the thin film resistor is provided in the direction of flow with a transverse cylindrical bore, the length to diameter ratio of which must be larger than 1.5, the metal layer of the thin film resistors being aligned parallel to the direction of flow of the medium to be measured.

Preferably, the length to diameter ratio of this transverse bore is larger than two. Furthermore, it is advantageous for the external shape of the protective tube in the region of the transverse bore to be hexagonal and for the transverse bore to run perpendicular to two parallel faces.

It has proven advantageous for the thin film resistors to take the form of a rectangular plate. Each resistor, at one of its ends, is attached to an electrically insulating tube with double or multiple longitudinal through-holes formed therein, with said multiple through-holes each housing one connecting wire for the thin film resistor. Preferably the thin film resistor is inserted into a slot on the end face of the insulating tube and attached with solder glass.

For measurements in corrosive media, it is advantageous for the metal layer of the thin film resistors to be covered with a thin plate of electrically insulating material, which is bonded to the metal layer preferably with a layer of refractory glass ceramic and a layer of refractory solder glass.

A surprising finding was that the measured results of this mass flow measuring device exhibit only a very slight dependence on upstream conditions and, in addition, are not sensitive to derivations from an exactly parallel alignment of the thin film resistors to the direction of flow. High measuring precision in a wide measuring range with short response time is achieved.

The invention is further illustrated by the drawings, wherein.

Figure 1:
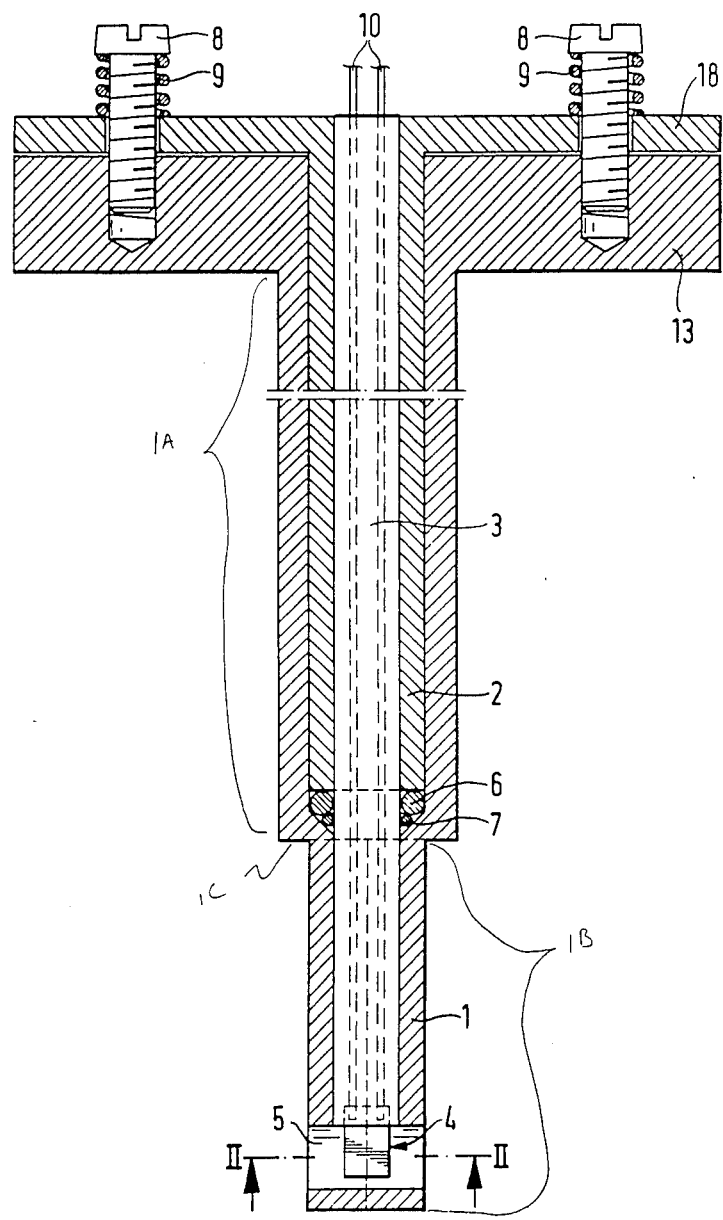
FIG. 1 is a longitudinal sectional view through a sensor with protective tube, thin film resistor and connecting leads.
Figure 2:
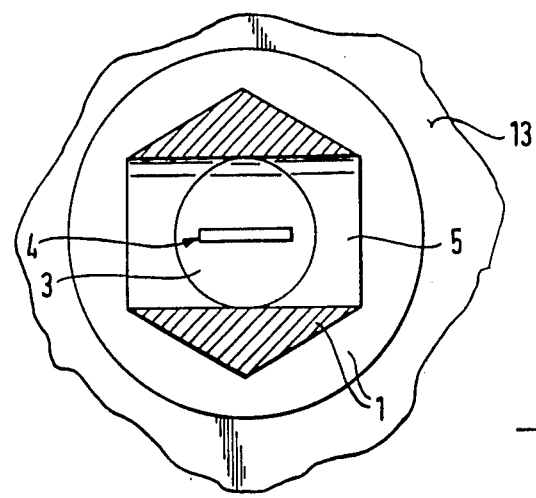
FIG. 2 is a cross sectional view along the lines II—II in the region of the transverse bore.

As described in further detail, and with reference to FIG. 1, the sensors for the measuring resistor, as well as for the reference resistor, comprise a protective tube 1 having a central longitudinal bore or opening therein parallel to the main axis thereof, a removable tube 2 that fits into the central longitudinal bore of the protective tube 1, and an electrically insulating tube 3, to which the thin film resistor 4 is attached. Protective tube 1 is a closed bottom tube, which has a hexagonal cross section in its lower part and a round cross section in the upper part. The upper portion (1A) of the protective tube 1 is of greater cross section than the lower portion (1B) thereof. The transition between the upper portion (1A) and the lower portion (1B) is marked by a stepped shoulder (1C). Within, and located at the distal end of, the hexagonal tube cross section is located a transverse bore 5, which runs perpendicular to two parallel side faces of the hexagonal shape. Transverse bore 5 is thus located perpendicular, or at right angle, to the centrally located longitudinal bore of the protective tube 1. The sensor is installed in the pipeline in such a way that transverse bore 5 runs parallel to the flow direction of the medium to be measured.

The length to diameter ratio of transverse bore 5 is at least 1.5. The inside diameter of protective tube 1 is smaller in the lower part (1B) than in the upper part (1A), and at the transition, proximate shoulder (1C), forms a chamber for compressing a seal 6. The upper part of protective tube 1 is provided with a flange 13, to which removable tube 2 is attached, also with a flange 18.

Removable tube 2 is an open bottom tube, the outside diameter and length of which are dimensioned such that tube 2 can be inserted into the centrally located longitudinal bore of the upper, round part (1A) of protective tube 1. The inside diameter of tube 2 is identical to the centrally located longitudinal bore of protective tube 1 in the lower, hexagonal part (1B). Tubes 1 and 2 can be made of any suitable metal or other material that can perform under the conditions of use.

Electrically insulating tube 3 is made of ceramic and has a plurality of small through-holes formed therein. The electrically insulating tube is fixed in removable tube 2.The length of insulating tube 3 is dimensioned such that it projects from removable tube 2 into the lower, hexagonal part of protective tube 1 and extends to the top edge of transverse bore 5. To this end of the insulating tube 3 is attached thin film resistor 4, which has the form of a thin rectangular plate. The thin rectangular plate 4 is attached at one of its ends to the insulating tube 3 and aligned such that the metallized surface runs parallel to the axis of bore 5. Insulating tube 3 houses in the through-holes formed therein two connecting wires 10 of thin film resistor 4.

The seal between protective tube 1 and removable tube 2 on the one hand and protective tube 2 and insulating tube 3 on the other hand is made by two sealing rings 6 and 7 of heat resistant and corrosion resistant material that are known in the art. They are seated snugly on insulating tube 3 at the end of removable tube 2 and are pressed by removable tube 2 against the chamber in the interior of protective tube 1. In order to ensure the necessary contact pressure even in the event of plastic flow of the sealing material, the screwed joint 8 between protective tube flange 13 and removable tube flange 18 is provided with a spring 9.

The heated temperature dependent thin film resistor 4 is supplied by a conventional electronic control circuit with current such that its temperature is kept constant relative to the medium temperature and is surrounded uniformly by this medium except for one of its ends. This results in a rapid response when there is a change in the mass flow or the medium temperature and it provides great sensitivity because of the large area participating in heat exchange with the medium. Since thin film resistor 4 is aligned with its surface parallel to the direction of flow, any effect of dirt on the system is to be expected only on the narrow leading edge and is therefore negligible.

The location of thin film resistor 4 in transverse bore 5 has several advantages. In addition to the protection against mechanical damaging, transverse bore 5 represents a well defined flow channel, which unexpectedly makes the arrangement relatively insensitive to disturbances in the flow characteristics. Just as unexpectedly it ensures that unavoidable installation inaccuracies relating to parallelism of transverse bore 5 and the direction of flow cause only insignificant changes in the measured result. To attain these advantages it is essential that the length to diameter ratio of transverse bore 5 is at least 1.5, preferably at least 2. In tests with thin film resistors which were not installed in such a transverse bore, the slightest angular changes relative to parallel orientation caused significant deviations in measured values.

Figure 3:
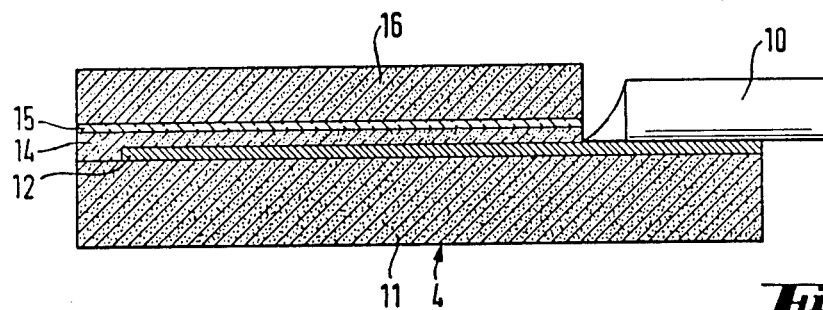
FIG. 3 is a sectional view of the structure of a thin film resistor with cover.

FIG. 3 shows the preferred design of thin film resistor 4 in detail. The thin film metal layer 12, preferably platinum or iridium, is applied on a thin plate 11 of electrically insulating material of good thermal conductivity, preferably ceramic. This can be performed with known methods; e.g., by a high frequency sputtering technique. Thin film layer 12 is structured, the major part of the area occupied by the resistor layer. Two connecting wires 10 are contacted with the end region of thin film layer 12. Thin film layer 12 is covered with a thin layer 14 of glass ceramic, whose expansion coefficient is matched to that of the ceramic of plate 11 and which even at temperatures up to 600° C. causes no changes in the resistor layer, e.g., by diffusion of ions. The ceramic and glass ceramic are known materials and any suitable examples thereof may be used for purposes of the invention.

However. microscopically fine cracks and pores often occur in the glass ceramic. In order also to protect the resistor layer therefrom, a thin plate 16 of ceramic is attached to glass ceramic layer 14 by means of a very thin layer of refractory solder glass. Solder glasses of this type are also known in the art and any suitable ones can be used for purposes of the invention.

Figure 4:
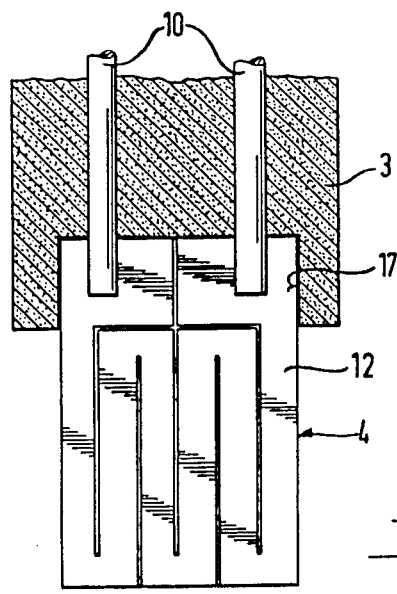
FIG. 4 is a partial sectional view of the attachment of the thin film resistors to the insulating tube.

As shown in FIG. 4, insulating tube 3 has at its front face a slot 17, which is dimensioned such that it can locate and hold the connecting part of thin film resistor 4 with connecting wires 10. Thin film resistor 4 is inserted into slot 17 of insulating tube 3, and connecting wires 10 are housed within the through-holes formed in insulating tube 3. The attachment is made by a refractory solder glass with matching expansion coefficient, with which the slot is filled. With this fixing device a mechanically stable connection of thin film resistor 4 and insulating tube 3 is obtained. The relatively low thermal conductivity of the solder glass used also has the consequence that heat flow from thin film resistor 4 to insulating tube 3 is limited and rapid response to flow changes is ensured.

The construction of a measuring resistor described herein is applicable in the same way for the corresponding reference resistor.

Further variations and modifications of the invention will become apparent to those skilled in the art and such variations and modifications are intended to be encompassed by the claims appended hereto.

We claim:
1. A device for the use in the thermal measurement of the mass flow of gases and liquids in pipelines comprising a protective tube with a longitudinal axis extending along its length and a centrally located longitudinal bore formed therein which is parallel to the longitudinal axis thereof, said protective tube having a transverse cylindrical bore formed therein which is at a distal end thereof, said transverse bore being oriented 90° with respect to the central longitudinal bore and positioned such that the longitudinal bore opens into said transverse bore; a temperature dependent thin film resistor located in said transverse bore and forming part of a bridge circuit, the length to diameter ratio of said transverse bore being greater than 1.5, the metal layer of the thin film resistor being aligned parallel to the axis of said transverse bore and said protective tube, in the region of the transverse cylindrical bore, is of hexagonal external shape and the transverse cylindrical bore runs perpendicular to two parallel faces of the hexagonal shaped portion of said protective tube.

2. The device according to claim 1, wherein the length to diameter ratio of the transverse bore is larger than two.

3. The device according to claim 1, wherein said thin film resistor has a metal layer on one surface thereof, said layer being covered with a thin plate of electrically insulating material.

4. A device for the thermal measurement of the mass flow of gases and liquids in pipelines comprising at least two temperature dependent thin film resistors which function as measuring and reference resistors respectively as part of a bridge circuit, at least one of said resistors being electrically heated by means of a control circuit, each of said resistors being contained within a protective tube having a centrally located longitudinal bore parallel to a longitudinal axis extending along the length of said protective tube and said protective tube having a cylindrical transverse bore at a distal end oriented 90° with respect to the centrally located longitudinal bore and positioned such that said longitudinal bore opens into said transverse bore, the length to diameter ratio of said transverse bore being greater than 1.5, and said thin film resistor including a metal layer the planar surface of which is aligned parallel to the axis of said transverse bore and said protective tube in the region of the cylindrical transverse bore is of hexagonal external shape and the cylindrical transvese bore runs perpendicular to two parallel faces of the hexagonal shaped portion of said protective tube.

5. The device according to claim 4, wherein the length to diameter ratio of the transverse bore is larger than two.

6. A device for use in the thermal measurement of the mass flow of gases and liquids in a pipeline, comprising:
a first tube having a longitudinal axis extending along its length and a first bore formed therein which has an axis parallel with the longitudinal axis of said first tube, said first tube having a second bore formed therein which has an axis that extends transverse to the axis of the first bore, the first and second bores of said first tube being arranged such that an end of the first bore opens into the second bore;
a second tube positioned within the first bore;
a temperature dependent resistor means for forming part of a bridge circuit, said resistor means being in the form of a thin film of resistive material coated on a substrate the planar surfaces of which extend essentially parallel to the axis of the second bore and an edge of which is in attachment with a first end of said second tube.

7. The device according to claim 6 wherein the length to diameter ratio of the second bore is greater than 1.5.

8. The device according to claim 7 wherein the length to diameter ratio of the second bore is greater than two.

9. The device according to claim 6 wherein said first tube has a hexagonal external shape in the region of the second bore and the second bore extends through said first tube perpendicularly to two parallel faces of the hexagonal shaped portion of said first tube.

10. The device according to claim 6 wherein said second tube has a plurality of through-holes formed therein which extend essentially parallel to the longitudinal axis of said first tube and are adapted to sheath a plurality of connecting wires, said first end of said second tube having a slot formed therein in which one end of said thin film resistor is secured and said connecting wires each having one end in contact with said thin film resistor.

11. The device according to claim 10 wherein the thin film resistor is secured to said second tube with solder glass.

12. A device according to claim 6, wherein said resistor means is a measuring resistor.

13. A device according to claim 6 wherein said resistor means is a reference resistor.

14. A device for use in the thermal measurement of the mass flow of gases and liquids in pipelines comprising a protective tube with a longitudinal axis extending along its length and a centrally located longitudinal bore formed therein which is parallel to the longitudinal axis thereof, said protective tube having a transverse cylindrical bore formed therein which is at a distal end thereof, said transverse bore being oriented 90° with respect to the central longitudinal bore and positioned such that the longitudinal bore opens into said transverse bore; a temperature dependent thin film resistor located in said transverse bore and forming part of a bridge circuit,the length to diameter ratio of said transverse bore being greater than 1.5, the metal layer of the thin film resistor being aligned parallel to the axis of said transverse bore, said thin film resistor being in the form of a rectangular plate which has one of its ends attached to an electrically insulating tube (3) located within said centrally located longitudinal bore of said protective tube, and said insulating tube (3) adapted to sheath a plurality of connecting wires.

15. The device according to claim 14, wherein a portion of said thin film resistor and an end of each of said connecting wires are located in a slot formed in an end face of said insulating tube (3) said resistor being attached to said insulating tube with solder glass.

16. A device for the thermal measurement of the mass flow of gases and liquids in pipelines comprising at least two temperature dependent thin film resistors which function as measuring and reference resistors respectively as part of a bridge circuit, at least one of said resistors being electrically heated by means of a control circuit, each of said resistors being contained within a protective tube having a centrally located longitudinal bore parallel to a longitudinal axis extending along the length of said protective tube and said protective tube having a cylindrical transverse bore at a distal end oriented 90° with respect to the centrally located longitudinal bore and positioned such that said longitudinal bore opens into said transverse bore, the length to diameter ratio of said transverse bore being greater than 1.5, and said thin film resistor including a metal layer the planar surface of which is aligned parallel to the axis of said transverse bore, said thin film resistor being in the form of a rectangular plate which has one of its ends attached to an electrically insulating tube (3) located within said centrally located longitudinal bore of said protective tube, and said insulating tube adapted to sheath a plurality of connecting wires.

17. The device according to claim 16, wherein a portion of said thin film resistor and an end of each of said connecting wires are located in a slot formed in an end face of said insulating tube (3), said resistor being attached to said insulating tube with solder glass.

* * * * *